United States Patent Office 3,694,404
Patented Sept. 26, 1972

3,694,404
FLUORINATED COMPOUNDS
Frederick A. Fleming, St. Paul, Robert J. Koshar, Lincoln Township, Washington County, and Charles D. Wright, White Bear Lake, Minn., assignors to Minnesota Mining and Manufacturing Company, St. Paul, Minn.
No Drawing. Filed Nov. 16, 1964, Ser. No. 412,291
Int. Cl. C07c 119/04
U.S. Cl. 260—453 AL    3 Claims This invention relates to new and novel fluorinated organic isocyanate compounds.

Fluorine is known to be the most electronegative element and wherefore it is an oxidizing agent with very high potential. However, fluorine is a very low boiling and highly corrosive gas requiring rather special techniques in its manipulations, which limits the extent of its use. Among such possible uses are a number of industrial processes where high oxidizing potential can extend the range of application, increase rate of output and the like. Many industrial requirements have heretofore been met in a more or less satisfactory way using less powerful and more readily handled oxidizing agents. Highly active oxidizing agents like fluorine would be advantageous in industrial uses such as bleaching of wood pulp, fabrics and the like if readily handled, thus permitting shorter process time, use of lower concentration, etc.

Another field in which very high oxidation potentials are particularly desirable is that of reaction-type propellants where extreme releases of energy are necessary to achieve high specific impulses. For such purposes it is very desirable to have available relatively safely handled materials possessing even a substantial fraction of the oxidizing capacity of fluorine.

It is known that the oxidizing potential of fluorine is retained to a considerable extent when the fluorine atom is bonded covalently to nitrogen, e.g., in the fluoramino groups, —NF$_2$ and =NF. Compounds containing a plurality of these fluoramino groups have useful oxidizing power. When such groups are attached to residues which have carbon and nitrogen atoms, the compounds can be handled more conveniently than fluorine. The isocyanate group has now been found to be compatible with fluoramino groups.

While isocyanates are a well known class of compounds, so far as is known no perfluorinated isocyanate compounds of the type described herein have been heretofore available.

It is an object of this invention to prepare certain new organic compounds containing the isocyanate functional group.

It is another object of the invention to provide fluorinated oxidant compounds.

Other objects will be apparent from the disclosure herein made.

In accordance with the above and other objects of the invention, novel organic compounds have been prepared having the formula

R—N=C=O wherein R is a radical consisting essentially of carbon, nitrogen and fluorine, having 1 to 2 carbon atoms, being attached to the isocyanate group through a carbon atom and containing no carbon-carbon bonds, and containing at least one fluorinated nitrogen atom and having a ratio of nitrogen to carbon atoms ranging from 1:2 to 2:1.

Thus R includes the radicals:

F$_2$N—CF$_2$—
FN=CF—
F$_2$N—CF$_2$—NF—CF(NF$_2$)—
(F$_2$N)$_2$—CF—
(F$_2$N)$_2$—CF—NF—CF$_2$—
(F$_2$N)$_2$—CF—NF—CF(NF$_2$)—

$$F_2N-\overset{NF}{\underset{\|}{C}}-NF-CF_2-$$

$$F_2N-\overset{NF}{\underset{\|}{C}}-NF-\overset{NF_2}{\underset{|}{C}}F-$$

$$F_2N-\overset{NF}{\underset{\|}{C}}-$$

$$(F_2N)_2CF-NF-\overset{NF}{\underset{\|}{C}}-$$

CF$_2$—NF—CF$_3$ and the like.

The compounds of the invention can accordingly be characterized as compounds containing the isocyanate group and otherwise consisting essentially of carbon, nitrogen and fluorine; said compounds having from 2 to 3 carbon atoms separated by nitrogen atoms, and containing at least 2 nitrogen atoms, one of which is fluorinated; having a ratio of nitrogen to carbon atoms ranging from 2:3 to 5:3. They contain 40 to 60 percent of fluorine.

Illustrative compounds of the invention, and their content of fluorine, are as follows:

| Compound: | Percent fluorine |
|---|---|
| F$_2$NCF$_2$N=C=O | 52.7 |
| (F$_2$N)$_2$CFN=C=O | 53.7 |
| CF$_3$NFCF$_2$N=C=O | 58.8 |
| CF$_3$NFCF(NF$_2$)N=C=O | 58.6 |
| F$_2$NCF$_2$NFCF(NF$_2$)N=C=O | 58.5 |
| (F$_2$N)$_2$CFNFCF(NF$_2$)N=C=O | 58.4 |
| (F$_2$N)$_2$CFNFCF$_2$N=C=O | 58.5 |
| F$_2$NCF$_2$NFCF$_2$N=C=O | 58.6 |
| F$_2$NC(=NF)N=C=O | 41.0 |
| F$_2$NC(=NF)NFC(=NF)N=C=O | 43.8 |
| CF$_3$NFC(=NF)N=C=O | 50.3 |
| F$_2$NCF$_2$NFC(=NF)N=C=O | 51.4 |
| (F$_2$N)$_2$CFNFC(=NF)N=C=O | 52.2 |
| F$_2$NC(=NF)NFCF$_2$N=C=O | 51.4 |
| FC(=NF)NFCF$_2$N=C=O | 50.3 |
| F$_2$NC(=NF)NFCF(NF$_2$)N=C=O | 52.2 |
| FC(=NF)NFCF(NF$_2$)N=C=O | 51.4 |
| FC(=NF)NFC(=NF)N=C=O | 41.3 |

The isocyanates of this invention can be obtained by the fluorination of nitrogenous cyclic or acyclic molecules containing the divalent radical, $$-NH\overset{O}{\underset{\|}{C}}NH-$$

or its tautomeric structure, $$=N-\overset{OH}{\underset{|}{C}}=N-$$

attached to carbon atoms therein.

Examples of such nitrogenous compounds are imidurazole, ammeline, ammelide, cyameluric acid and guanylurea. Thus, difluoraminodifluoromethyl isocyanate, for example, is one of the isocyanate compounds formed from imidurazole by a combination of fluorination of certain bonds, replacement of hydrogen and cleavage of the ring by carbon-nitrogen bond scission. Without wishing to be bound thereby, the following equation may represent the specific overall reaction:

$$\underset{\underset{H}{|}}{\underset{N}{O=C}}\overset{NH-NH}{\diagdown}C=NH \xrightarrow{7F_2} O=C=N-CF_2-NF_2 + 2NF_3 + 4HF$$

Broadly speaking, the direct fluorination process to form the isocyanates of the invention is carried out by treating the described nitrogenous cyclic or acyclic compound such as ammeline, cyameluric acid, imidurazole or guanylurea with elemental fluorine. For best results, the starting material should be substantially anhydrous, to avoid destruction of the reactive unsaturated groups, $>C=NF$ and $—N=C=O$, after their formation, and should be diluted with a solid diluent, e.g., sodium fluoride. Sodium fluoride and the like are especially advantageously used to combine with hydrogen fluoride which is formed during the process. The process can be carried out at a temperature in the range of about $-100°$ C. to $+60°$ C., or even somewhat higher. Reaction takes place very slowly at $-100°$ C. and is markedly increased by raising the temperature to $-75°$ C. or higher. The optimum conditions for fluorination usually vary for each starting material, i.e., the described nitrogenous cyclic or acyclic compound. For example, it is preferred that ammeline be reacted at about $0°$ C., cyameluric acid at about $25°$ C. and guanylurea at about $-25°$ C. Other compounds containing the ureido group,

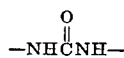

or its tautomeric form, may also be used as starting materials, e.g., ammelide.

The direct fluorination process can be conducted by a variety of methods, such as the contact of elemental fluorine with a stationary or agitated bed of the above described starting material or the passage of fluorine through a solution or suspension of the heterocyclic compound. Fluorinations may be carried out under essentially atmospheric pressure, using a flow system or a closed system wherein fluorine under a greater than one atmosphere of pressure is used.

The fluorine is conveniently introduced as a gas under slightly positive pressure, or if closed vessels are used, by employing diluents and proper precautions, pressures up to 100 p.s.i. can be used. Preferably, the fluorine is diluted with nitrogen or other inert gas, such as argon, helium, a chlorofluorocarbon, such as dichlorodifluoromethane, and the like, to give about 0.1 to 60 percent of fluorine in the gas stream. Too high a concentration will result in burning of the starting material, and this can be avoided by reduction of the fluorine concentration and/or lowering the reaction temperatures; however, undiluted fluorine can be used, using great caution and slow addition when working with the solid, finely powdered undiluted starting materials. Residual fluorine should always be flushed out of the reactants and the apparatus, using dry nitrogen or the like, to avoid unpleasant and toxic exposure to fluorine as well as untoward effects owing to the strong oxidizing power of this substance. The apparatus used is preferably constructed from Monel, copper or other material inert toward fluorine under ordinary conditions. The solid, finely divided starting material such as ammeline is placed in a suitable container, such as a boat, which may be of stainless steel or copper or spread on a metal sheet or plate which may be porous to allow the passage of fluorine, and is then contacted with fluorine for a period ranging from about 10 minutes to greater than 8 hours. The time depends on the amount of the starting material, the rate of fluorination and the total amount of fluorine required. The longer times of contact are usually used with more highly diluted fluorine and for large samples in batch operations. Excessive exposure to fluorine, especially when highly concentrated fluorine is used, should be avoided to suppress the possibility of extensive fluorinolysis and reaction of fluorine with the isocyanate functional group. Preferably, the reaction mixture is maintained at a temperature in the range of about $-25°$ to $+25°$ C. When convenient, lower temperatures can be used and it is preferred to use temperatures not in excess of about $50°$ C.

Since the reactions of fluorine are generally exothermic, care must be taken to control the exotherm by the regulation of temperature, concentration of fluorine as well as the use of liquid diluents, agitation and the like. Liquid diluents which may be used include polyhalogenated compositions inert toward fluorine under ordinary conditions, such as, for example, dichlorodifluoromethane, perfluorooctane, perfluorocyclobutane, perfluorotributylamine and the like.

For best results, the reactant is mixed with from 1 to 4 times its weight of finely divided sodium fluoride or potassium fluoride or the like. Hydrogen fluoride formed in the reaction is taken up by the sodium fluoride in the reaction mixture and need not be removed subsequently from the products by means of a scrubber located downstream from the reactor. The fluorine gas is passed over or through the reaction mixture and the more volatile products including the bulk of the compounds of this invention, as well as smaller fragments, are condensed in a suitable trap cooled by liquid air or other means. The isocyanate compounds of the invention can also remain as a residue in the reactor or in solution when liquid diluents are used. The various isocyanates of this invention are best handled in high vacuum gas transfer systems.

An additional synthetic route to the compounds of the invention is the addition of isocyanic acid to the selected fluorimino compound, followed by fluorination. Thus, isocyanic acid is added to perfluoroformamidine and the intermediate fluorsamino compound is fluorinated, all at temperatures below $-20°$ C., to produce bis(difluoramino)-fluoromethyl isocyanate

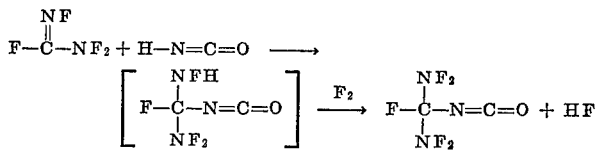

The reactivity of the isocyanate group is well known and these compounds permit the introduction of high-energy groups (e.g., groups containing nitrogen-fluorine bonds) into molecules by reaction with active hydrogen-containing groups such as hydroxyl groups, amino groups and the like.

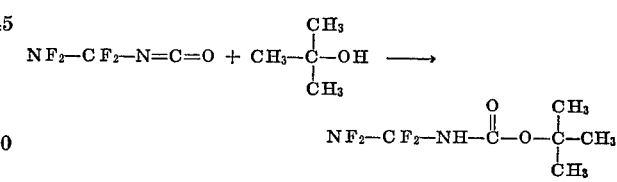

The oxidizing capacity of the compounds of the invention is determined by contacting the compound with excess potassium iodide in aqueous acetonitrile or acetic acid followed by titration of the iodide released with standard solution of sodium thiosulfate. The compounds of the invention have boiling points in the range of about $-30°$ C. to $+120°$ C. The compositions of the invention can be shock-sensitive, but are usually not so sensitive that they cannot be handled conveniently.

The isocyanates of the invention are thus seen to be fluid, somewhat shock-sensitive compounds which contain carbon, nitrogen, oxygen and fluorine, and which have an oxidizing capacity of up to about 50 or more milliequivalents of iodine per gram. They are compounds with somewhat different physical properties, and can be separated from each other. They contain little or no residual hydrogen in the molecule.

The new compounds are soluble in such solvents as methylene chloride, trichlorofluoromethane and the like. They are generally relatively soluble in fluorocarbon solvents such as perfluorooctane and are less soluble in hydrocarbons. Their reactivity is variable. Certain of the compounds may be distilled with great caution under highly reduced pressure; other may be distilled readily at atmospheric pressure. They are also separated and can be characterized by vapor phase chromatography, employing an essentially anhydrous fluorochemical stationary phase as more fully described hereinafter.

When treated with water, or exposed to moisture, these fluorinated isocyanate compounds may hydrolyze to a greater or less extent with a lowering or loss of their oxidizing power.

When mixed with substances which can be oxidized, such as an organic polymer, and ignited as by means of a squib, they burn with intense heat and the formation of large volumes of gases. Thus, they can be used in propellant or pyrotechnic compositions.

The products of the process are recovered from excess fluorine and any highly volatile fluorinated cleavage products such as $CF_4$, $NF_3$, etc. which may be present. In the direct fluorination process, numerous products are formed, including the products of the invention. These are initially obtained as a mixture, and the desired products are separated and isolated by fractionation procedures including fractional distillation, gas chromatography and the like.

The isocyanate compounds of this invention are oxidants useful as bleaching agents, explosive ingredients, rocket fuel ingredients, pyrotechnic ingredients and chemical intermediates. In general, the compounds containing nitrogen-fluorine bonds in a high proportion relative to the remainder are especially useful for rocket propellants or explosives, whereas those compounds containing nitrogen-fluorine bonds in a low proportion relative to the remainder are especially useful as bleaching agents.

The isocyanate compounds of this invention can be characterized by various spectroscopic analyses. Characteristic infrared absorptions are found in the region of about 9.5 to 11.5 microns which can be complex and broad and are associated at least in part with nitrogen-fluorine bonding, e.g., in groups such as $-NF_2$ and $=NF$. The intensities and complexity of these absorptions can vary widely. Absorptions due to the isocyanate functional group, $-N=C=O$, which is usually relatively intense, can be found in the region of about 4.35 to 4.5 microns.

Fluorine nuclear magnetic resonance spectroscopic measurements are also useful for the identification of the described compounds. Various types of fluorine-containing groups in the molecule can be distinguished by their shielding values expressed in $\phi$ units, employing $CFCl_3$ as the reference as described by G. Filipovich and G. V. D. Tiers (Journal of Physical Chemistry, Vol. 63, pp. 761–762, 1959); the $\phi^*$ values defined there by the authors are here given simply as $\phi$ values. The difluoramino groups, $NF_2$, of the compounds of this invention exhibit shielding values due to the fluorines in the region between about $-10$ to $-60\phi$ and more usually in the region of $-20$ to $-40\phi$. Shielding values due to the fluorine of the group, $=NF$, are usually found in the region between $-50$ to $+50\phi$ and sometimes higher.

Many of the products produced by the fluorination of the described starting materials can be toxic or explode when subjected to impact, rapid cooling or heating and therefore require safety equipment and special techniques for handling. Generally speaking, ordinary laboratory hoods equipped with ¼ to ½ inch plastic shields provide a safe working area when about one gram of the fluorination product mixture is manipulated, reacted, tested, stored, etc. Protective clothing for the operator such as leather jacket, gloves, face shield and ear plugs is recommended. Larger quantities of the fluorination products should be handled with remote manipulators.

Certain compounds of the invention have a higher tendency to explode when undergoing phase changes when in pure or highly concentrated form. Therefore, the use of a non-flammable slush bath such as a $-111°$ C. bath prepared by mixing liquid nitrogen with trichlorofluoromethane is recommended when said compounds are manipulated in gas transfer systems.

The following examples will more specifically illustrate the fluorinated oxidant compounds of the invention and the process for their preparation.

EXAMPLE 1

This example illustrates a large scale fluorination of ammeline. It will be recognized that use of barricades and other suitable protective measures against accidental detonation is essential. All manipulations are done remotely through a reinforced concrete wall.

A 10 gallon stainless steel pressure reactor having inside diameter of 14 inches, and fitted with thermometer well, pressure gauge, a 4 inch magnetic stirrer, gas inlet line ending below the stirrer blade, gas outlet line with pressure relief valve and an external cooling coil on the reactor (120 feet length), is charged with 4 pounds of ammeline, 8 pounds of sodium fluoride and 90 pounds of perfluorocyclic ether, $C_8F_{16}O$ (available commercially under the designation FC-75 from Minnesota Mining and Manufacturing Company). The stirrer is operated at about 600 to 700 r.p.m. The reactor is cooled to about 5° C. and flushed thoroughly with a stream of nitrogen. Fluorine, diluted with from 10 to 20 percent by volume of nitrogen, is then introduced at a rate of about 1.6 cubic feet of fluorine per hour for about 5 hours. The pressure within the reactor is maintained at about 25 to 30 p.s.i.g., and the temperature is from about 5 to 15° C. Volatile products of the reaction are then vented and allowed to pass through a glass wool filter and are condensed in the perfluorocyclic ether contained in a receiver at $-35°$ C. Volatile materials which are uncondensed are vented.

The products remaining in the diluent in the reactor are expelled by gradually raising the temperature to 100° C. while flushing with nitrogen, and are collected in the same receiver.

The contents of the receiver which contain about a 10 percent solution of the products in the perfluorocyclic ether are fractionated under atmospheric pressure in a 20 plate bubble plate column constructed of borosilicate glass. The fraction boiling at about $-5°$ to 0° C. contains as one of the components difluoraminodifluoromethyl isocyanate

$F_2N-CF_2-NCO$ which can be further purified by vapor phase chromatography, employing a column of 33 percent by weight perfluorotributylamine on Chromasorb P (a diatomaceous silica product from Johns-Manville Company) at $-20°$ C., redistillation, or both. The chromatographic relative retention time, $T_R$, of $NF_2CF_2NCO$ relative to the reference compound, $CF_2Cl_2$, is about 505 and is derived from the equation $$T_R = \frac{Tr \text{ (component)} - Tr \text{ (air)}}{Tr \text{ (reference)} - Tr \text{ (air)}} \times 100$$

where Tr is retention time in minutes after injection. This isocyanate compound has prominent absorptions in the infrared at 4.40 microns due to the isocyanate group as well as absorptions at about 8.1 microns to 8.5 microns due to CF linkages and other absorptions at about 10.1 microns and 10.7 microns due to the $NF_2$ group. Other prominent bonds are found at 6.81, 8.90 and 10.72 microns. Fluorine nuclear magnetic resonance gives the following characteristic shielding values:

| $\phi$ | Assignment | Approximate area ratio |
|---|---|---|
| $-25.3$ | $NF_2$ | 1 |
| $+76.2$ | $CF_2$ | 1 |

Difluoramino difluoromethyl isocyanate reacts at 25° C. with an equimolar amount of tert-butyl alcohol to form the solid adduct,

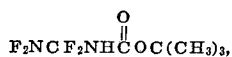

$$F_2NCF_2NHCOC(CH_3)_3,$$

which analyzed as follows:

Calculated for $C_6F_4H_{10}N_2O_2$ (percent): C, 33.0; F, 34.8. Found (percent): C, 32.7; F, 37.2.

A higher boiling fraction (B.P. 15–20° C.) is also isolated by distillation of products from direct fluorination of ammeline, as set forth above. This fraction is found to contain bis(difluoramino)fluoromethyl isocyanate, $(F_2N)_2CFNCO$, as one of the components, and can be purified by chromatography employing a column of 33 percent by weight of perfluoropolytributylamine (available commercially under the designation FX–45 from Minnesota Mining and Manufacturing Company) on diatomaceous silica (Chromasorb P). The retention time ($T_R$) relative to the reference compound, $CFCl_3$, is about 265 when a 24 foot, ½ inch column at 25° C. is used; the $T_R$ value is derived from the equation described above. On this same column, $F_2NCF_2NCO$ has a $T_R$ of about 90 using $CFCl_3$ as reference.

Bis(difluoramino)fluoromethyl isocyanate has prominent absorptions in the infrared at about 4.37 microns due to the isocyanate group, absorptions at 8.12 microns and 8.31 microns in the region expected for the CF absorption, and absorptions at 10.54 microns and 11.1 microns due to the $NF_2$ groups. Other prominent absorption bands are found at 6.76, 8.79 and 9.87 microns.

Fluorine nuclear magnetic resonance spectroscopy gives the following characteristic shielding values for bis(difluoramino)fluoromethyl isocyanate:

| $\phi$ | Assignment | Approximate area ratio |
|---|---|---|
| −25.6 | $NF_2$ | 4 |
| +112.2 | CF | 1 |

A sample of bis(difluoramino)fluoromethyl isocyanate gave a molecular weight of 177 and 176 by mass spectroscopic effusion rate studies. Calculated, 177 for $C_2F_5N_3O$.

EXAMPLE 2

An anhydrous mixture of 1 gram of imidurazole (3-amino-5-hydroxy-1,2,4-triazole) prepared by the method of Pellizzari and Roncagliolo, Gazzeta chimica italiana, vol. 31, part I, page 477 (1901), and 5 grams of sodium fluoride is placed on a 2 inch by 10 inch sintered plate of Monel which is enclosed in a 0.7 liter brass fluorination reactor. The reactor is attached to a liquid oxygen-cooled borosilicate glass trap which is open at one end. After the reactor is cooled to −10° C. and is purged with nitrogen, fluorine is allowed to pass through the mixture at a concentration of 7.2 percent by volume in nitrogen for one-half hour, then 12.4 percent for about 1.5 hours at average flow rates of 0.024 mole of fluorine per hour, followed by concentrations of 8.1 percent for one-half hour and 12.5 percent for one hour at flow rates of 0.09 mole per hour. The total amount of fluorine used is 0.18 mole and the temperature within the reactor ranges between −10° and 0° C. After the completion of the fluorination, the temperature of the reactor is permitted to rise to room temperature, and the products are removed in a stream of nitrogen (300 ml. per minute) during 3 hours. The products from the reaction are condensed in the borosilicate glass trap. The total recovered product is distilled under vacuum at −78° C. to give a residue of 0.2 ml. liquid at −78° C. in contact with 390 ml. of vapor at about 35 mm. of Hg. The above product is separated by vapor phase chromatography on a column of 33 percent by weight of perfluoropolytributylamine on diatomaceous silica at 25° C. Difluoraminodifluoromethyl isocyanate is one of the isocyanate compounds isolated.

EXAMPLE 3

An anhydrous mixture of one gram of cyameluric acid and 4 grams of sodium fluoride is placed in a horizontal cylindrical copper reactor (12 inches long, 3 inch diameter) which is equipped with baffles on the inside, a fluorine and nitrogen inlet on one end and an effluent gas outlet on the other end. The outlet is connected directly to a liquid oxygen-cooled trap as described in Example 2. The reactor is rotated at about 20 r.p.m. at 25° C., flushed with nitrogen and then charged first with a concentration of 9.8 volume percent of fluorine for 0.5 hour, followed by 15.6 volume percent for 0.5 hour and then 22.8 volume percent for 0.5 hour. The fluorine flow rate is maintained essentially at a constant rate of 0.12 mole/hour and the concentration of fluorine is changed by adjusting the nitrogen flow rate.

The temperature within the reactor ranges from 25° to 34° C. as the result of exotherms. After completion of the fluorination, the reactor is purged with nitrogen for two hours.

The products which are collected in the trap are allowed to warm to −78° C. under vacuum, and the gases expand into a total volume of about 370 ml. The more volatile products which consist mainly of $COF_2$ are intermittently removed until a pressure corresponding to 14 mm. of Hg. remains above the remaining residue. The residue, which amounts to 0.2 ml. of liquid at −78° C., is chromatographed to obtain difluoraminodifluoromethyl isocyanate.

EXAMPLE 4

An anhydrous mixture of 0.75 gram of ammeline and 2.25 grams of sodium fluoride is charged into the reactor described in Example 2. The reactor is cooled to 0° C. and is purged with nitrogen at 100 cc./min. for one hour. The mixture is fluorinated with a concentration of 10 percent by volume of fluorine in nitrogen (flow rate: 106 cc./min.) for 3.3 hours until a total of about 0.06 mole of fluorine is delivered. The reactor is then allowed to warm to 20° C. and is flushed with nitrogen during this period. The product which collects in the trap directly attached to the reactor contains numerous fluorinated compounds boiling in the range of about −100° C. to 100° C. This mixture contains 0.46 gram of a fraction boiling between −35° C. and 30° C. from which difluoraminodifluoromethyl isocyanate and bis(difluoramino)fluoromethyl isocyanate can be isolated by the gas-liquid chromatographic procedures as set forth in Example 1. It should be noted that the reaction mixture contains compounds having the various chain lengths and substitutions shown on page 4 hereinabove. These are most conveniently separated and isolated by chromatographic techniques. Thus, the mixture also contains about 0.8 gram of a fraction having a vapor pressure of less than 15 mm. Hg at 25° C. (gas volume: 130 cc.) which contains other isocyanate compounds of this invention, such as $(NF_2)_2CFNFCF(NF_2)N=C=O$ and

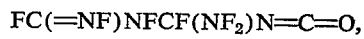

$$FC(=NF)NFCF(NF_2)N=C=O,$$

as determined by infrared and nuclear magnetic resonance spectroscopy. These compounds are also isolated by gas-liquid chromatographic procedures using higher-boiling components and higher temperatures.

EXAMPLE 5

A mixture of one gram of guanylurea and one gram of sodium fluoride is placed in the reactor described in Example 2. A concentration of 5.7 percent fluorine in nitrogen is passed through the mixture which is maintained at about −25° C. A total of about 0.13 mole of fluorine is delivered at a relatively constant flow rate over a period of 7 hours. The reactor is then allowed to warm to room temperature while flushing with nitrogen over a period of about 2 hours. A total of about 10 millimoles of product is collected in a borosilicate glass trap cooled with liquid oxygen. The product is partially separated by simple distillation under high vacuum, to yield 1.3 millimole of crude product having components boiling in the range of about −30° C. to 30° C. Chromatographic separation of the reaction mixture yields bis(difluoramino)fluoromethyl isocyanate as well as difluoroamino fluoriminomethyl isocyanate.

What is claimed is:

1. A compound containing the isocyanate group and otherwise consisting essentially of nitrogen, carbon and fluorine, said compound having from 2 to 3 carbon atoms separated by nitrogen atoms and containing at least 2 nitrogen atoms, at least one of which is fluorinated; having a ratio of nitrogen to carbon atoms ranging from 2:3 to 5:3; and further characterized by containing from about 40 to 60 percent by weight of fluorine.

2. Difluoraminodifluoromethyl isocyanate having the formula:

$$F_2N-CF_2-NCO$$

3. Bis(difluoramino)fluoromethyl isocyanate having the formula:

$$(F_2N)_2CF-NCO$$

References Cited

Hoffman et al. Chem. Reviews, vol. 62, pp. 1–18 (1962).

LELAND A. SEBASTIAN, Primary Examiner

U.S. Cl. X.R.

149—109; 260—482 C